United States Patent [19]

Smith et al.

[11] 4,182,794

[45] Jan. 8, 1980

[54] METHOD FOR APPLYING A FIRE-RETARDANT COMPOSITION TO WOOD

[75] Inventors: William L. Smith; Robert H. Lalk, both of Midland, Mich.

[73] Assignee: The Dow Chemical Company, Midland, Mich.

[21] Appl. No.: 963,728

[22] Filed: Nov. 27, 1978

[51] Int. Cl.$^2$ .................... B32B 21/04; B32B 21/06
[52] U.S. Cl. ........................... 428/537; 252/8.1; 428/541; 428/921
[58] Field of Search ............... 428/541, 920, 921, 276, 428/537; 252/8.1

[56] References Cited

U.S. PATENT DOCUMENTS 4,054,720  10/1977  Tomita .................... 428/921

*Primary Examiner*—Marion E. McCamish
*Attorney, Agent, or Firm*—G. R. Plotecher

[57] ABSTRACT

Fire-retardant compositions consisting essentially of an inorganic, fire-retardant phosphate salt and a binder of a poly-2-oxazoline having a weight average molecular weight of at least about 1,000 and at least about 40 percent phosphorylated are applied to wood or wood products by an improved method comprising admixing with a solution of the composition, either prior to or simultaneously with the application of the composition to the wood or wood product, an anionic or nonionic organic phosphate ester surfactant, such as Victawet ® 35B. The use of these surfactants increases the rate and extent of penetration of the fire-retardant composition into the wood.

28 Claims, No Drawings

METHOD FOR APPLYING A FIRE-RETARDANT COMPOSITION TO WOOD

BACKGROUND OF THE INVENTION

1. Field of the Invention

This invention relates to fire-retardant compositions. In one aspect, the invention relates to novel compositions containing certain surface-active agents useful in increasing the rate and extent of penetration of the composition into wood and wood products. In another aspect, the invention relates to the use of these novel compositions.

2. Description of the Prior Art:

Most fire-retardant compositions must be applied to wood by a pressure treatment to achieve sufficient modification of the wood to reduce the flame-spread rating, one measure of fire-retardancy. However, inorganic, fire-retardant phosphate salts, such as mono and diammonium phosphate, polyphosphate, etc., make high solid solutions that can be applied by surface penetrating techiques, such as spray or roller coating, that results in an effective flame-spread control but upon exposure to various humidity conditions, these salts migrate to the surface. This migration not only depletes the salt content of the substrate, rendering it less fire-retardant, but can also severely disfigure the surface. Compositions containing these fire-retardant phosphate salts in combination with a partially hydrolyzed poly-2-oxazoline demonstrate substantially inhibited migratory properties but do not penetrate wood with sufficient speed and in sufficient quantity to permit their use on a production line operation employing surface penetrating techniques.

While surfactants are considered useful in surface applications generally, certain articles, such as "Treatment of Wood with Aqueous Solutions: Effect of Wetting Agents", *Indus. Engin. Chem.*, 32, 809 (1940) by the Forest Products Laboratory at Madison, Wisconsin, Forest Service U.S. Dept. of Agriculture, have been published which teach that surfactants do not increase the rate or extent of penetration of water or solutions into the surface pores of wood. Most anionic types, such as Aerosol® OT and Dowfax® 2A1 and 3B2, are generally not compatible with concentrated fire-retardant salt solutions and eventually precipitate. Many non-ionic surfactants are compatible with concentrated fire-retardant salt solutions but demonstrate no effect on the rate and extent of penetration of the salt into the wood.

SUMMARY OF THE INVENTION

According to this invention, fire-retardant compositions consisting essentially of an inorganic, fire-retardant phosphate salt and a binder of a poly-2-oxazoline having a weight average molecular weight of at least about 1,000 and at least about 40 percent phosphorylated, are applied to wood by an improved process comprising admixing with a solution of the composition, either prior to or simultaneously with the application of the composition to the wood, an anionic or nonionic organic phosphate ester surfactant compatible with the solution of the composition and in an amount sufficient to increase the rate and extent of the penetration of the composition into the wood. This improved method permits the application of these fire-retardant compositions to wood by production line operations employing surface penetrating techniques without sacrificing effective flame-spread control.

DETAILED DESCRIPTION OF THE INVENTION

Virtually any inorganic phosphate salt that will impart fire retardancy to wood can be used in the practice of this invention. "Fire-retardant", "fire retardancy", and the like here mean a condition in which the tendency of wood or a wood product to normally be combusted and support or propagate flames under various conditions of temperature, oxygen availability, and the like, is retarded, delayed, or diminished and may be attended by a tendency to extinguish or terminate combustion under certain conditions, such as charring. Monoammonium phosphate, diammonium phosphate, polyphosphate and various mixtures of these materials, such as FR-A ® (a 40:60 mixture of mono- and diammonium phosphate manufactured by Monsanto Company) are most familiar and thus preferred. The polyphosphates include liquid fertilizer which is generally a mixture of about 60 weight percent polyphosphate with the remaining 40 weight percent consisting of mono- and diammonium phosphate.

Poly-2-oxazolines, also known as N-acylated, linear polyalkylenimines, are used in the practice of this invention. Poly-2-oxazolines are known compounds consisting of n randomly-joined units (I, II) and are readily prepared by the ring-opening polymerization of 2-oxazolines or like compounds (III) followed by either full or partial hydrolysis.

(I)

(II)

(III)

The substituents and subscripts are later defined. The ring-opening polymerization of 2-oxazoline monomers is generally conducted in the presence of a cationic polymerization catalyst at a reaction temperature of about 0°–200° C. Typical catalysts include strong mineral acids, organic sulfonic acids and their esters, acidic salts such as ammonium sulfate, Lewis acids such as aluminum trichloride, stannous tetrachloride, boron trifluoride and organic diazoniumfluoroborates, dialkyl sulfates and other like catalysts. This ring-opening polymerization is further described by Tomalia et al., *J. Polymer Science*, 4, 2253 (1966); Bassiri et al., *Polymer Letters*, 5, 871 (1967); Seeliger, Ger. Pat. No. 1,206,585; Jones & Roth, U.S. Pat. No. 3,640,909; and Litt et al., U.S. Pat. No. 3,483,141.

The pre-hydrolyzed polymers thereby obtained are linear, N-acylated polyethylen- or polypropylenimines having a molecular structure consisting essentially of repeating units I. These polymers are easily converted (deacylated) to the phosphate salt by acid hydrolysis with phosphoric acid. The partially deacylated poly-2-oxazolines, i.e., the phosphate salts of poly-2-oxazoline, have a molecular structure consisting essentially of the randomly-joined units I and II, illustratively depicted as:

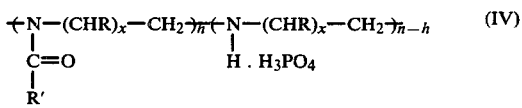

wherein:
n is the total number of units or degree of polymerization;
h is the number of acylated units; and
n-h is the number of phosphorylated (deacylated) units.

"Phosphorylated" here describes the product of a linear, N-acylated polyethylen- or polypropylenimine hydrolyzed with phosphoric acid such that the hydrolyzed polymer contains at least one phosphate group ($.H_3PO_4$).

The phosphate salts of the poly-2-oxazolines here used include both the fully and partially phosphorylated polymers. Partially phosphorylated poly-2-oxazolines have at least one phosphorylated secondary amine group (V)

per polymer chain as in IV where n-h is at least one. Preferably, the poly-2-oxazolines here used are at least about 40 percent phosphorylated (n-h is at least about 40 percent of n) and more preferably at least about 50 percent phosphorylated (n-h is at least about 50 percent of n). Although fully phosphorylated poly-2-oxazolines (n-h is or is about 100 percent of n) can be used, preferably the poly-2-oxazolines are phosphorylated to a maximum of about 90 percent (n-h is about 90 of n) and more preferably phosphorylated to a maximum of about 70 percent (n-h is about 70 percent of n).

As regards the previously undefined substituents and subscripts in formulae I–V, R is typically hydrogen or $C_1$–$C_3$ alkyl; R' is typically hydrogen, phenyl or alkyl having up to about 18 carbon atoms or an inertly-substituted derivative thereof; and x is 1 or 2. As used herein, "2-oxazoline" includes both 2-oxazoline monomers, i.e., x is 1, and 2-oxazine monomers, i.e., x is 2, and "poly-2-oxazoline" includes both poly-2-oxazoline polymers and poly-2-oxazine polymers. By such terms as "inertly-substituted" is meant that the substituents neither preclude the polymerization of the 2-oxazoline monomers nor preclude the hygroscopicity characteristics of the phosphate salts of the poly-2-oxazolines. Illustrative inert substituents include halogen, alkenyl hydrocarbons, alkoxy, ester, etc. Exemplary R substituents include hydrogen, methyl, ethyl and propyl and exemplary R' substituents include hydrogen, methyl, ethyl, propyl, pentyl, cyclohexyl, dodecyl, octadecyl, and the various halogenated, ethylenically unsaturated, etc., derivatives of each such as poly(2-trichloromethyl-2-oxazoline), poly(2-isopropenyl-2-oxazoline), etc. The partially hydrolyzed phosphate salts of poly(2-methyl-2-oxazoline), poly(2-ethyl-2-oxazoline), and poly(2-H-2-oxazoline) are preferred.

Phosphate salts of poly-2-oxazolines having a weight average molecular weight having at least about 1,000, as determined by the intrinsic viscosity-universal calibration curve, are used in the practice of this invention.

Typically these compounds have a weight average molecular weight of at least about 10,000 and preferably of at least about 100,000. Practical consideration, such as preparation, mechanical application, and the like are the only limitations upon the average maximum molecular weight of these compounds although in deference to convenience a maximum of about 1,000,000 is preferred. A maximum weight average molecular weight of about 500,000 is most preferred.

The respective concentrations of the phosphate salt of the poly-2-oxazoline and the fire-retardant phosphate salt in the composition of this invention can vary widely; the exact amounts of each depending upon the substrate and the degree of both fire-retardancy and hygroscopicity suppression desired. A phosphate salt of a poly-2-oxazoline concentration, based on the total weight of the composition, of at least about 2 weight percent and preferably of about 5 weight percent, is generally satisfactory. A maximum phosphate salt of a poly-2-oxazoline concentration of about 25 weight percent and preferably of about 15 weight percent is used in deference to economic considerations. Of course, the remaining weight percent consists of the fire-retardant phosphate salt, i.e., a minimum of about 75 weight percent and preferably of about 85 weight percent, and a maximum of about 98 weight percent and preferably of about 95 weight percent, respectively.

Any anionic or nonionic organic phosphate ester which is compatible with the fire-retardant composition (inorganic phosphate salt plus phosphorylated poly-2-oxazoline binder) and increases the rate and extent of penetration of the composition into wood can be used in this invention. Representative nonionic organic phosphate ester surfactants are those of the formula

where:
R" is a hydrophobic radical, typically a $C_4$–$C_{10}$ aliphatic or alicyclic hydrocarbon; and
R''' is a hydrophilic radical, typically a polyalkylene glycol or glycol ether.

Both R" and R''' can be linear or branched. Victawet ® 12 (VI where R" is octyl and both R''' are polyethylene glycols) manufactured by Stauffer Chemical Company is an illustrative nonionic organic phosphate ester surfactant. Representative anionic organic phosphates ester surfactants are those of the formula

where M is a neutralizing cation, such as an ion of an alkali metal, and R" is as previously defined. Victawet ® 35B and Victawet ® 58B (VII where M is a sodium cation and R" is 2-ethylhexyl or capryl) also manufactured by Stauffer Chemical Company are illustrative anionic organic phosphate ester surfactants. These surfactants can be used either alone or in combination with one another. The anionic surfactants are preferred to the nonionic.

Sufficient surfactant is here used to increase the rate and extent of penetration of the composition into the wood. A surfactant concentration (based upon the weight of the composition) of at least about 0.01 weight percent, and preferably of about 0.05 weight percent, is generally satisfactory. A maximum surfactant concentration of about 1 weight percent, and preferably of about 0.3 weight percent, is used for economic considerations.

The composition and surfactant are admixed with one another either prior to or simultaneously with the application of the composition to the wood. Preferably, the composition and surfactant are admixed prior to the application of the composition to the wood and the admixture can be in any conventional manner, such as stirring or shaking. The composition and surfactant are preferably blended such that the surfactant is relatively uniformly dispersed throughout the composition. If the composition and surfactant are simultaneously applied to the wood, their application is such that the surfactant and composition are relatively uniformly mixed prior to their contact with the wood surface. This latter admixture is most easily accomplished through spraying where the composition and surfactant are discharged from separate nozzles as mists and the individual mists comingle prior to contacting the wood surface.

The composition-surfactant mixture ("mixture") of this invention is applied to wood in any conventional manner, e.g., spraying, painting, dipping, roll-coating, reverse roll-coating, pressure or vacuum treating, precipitation, impregnating, etc. The mixture is particularly well suited for application on a production line operation employing surface penetrating techniques, such as spray or roller coating. Typically the mixture is dissolved in an aqueous medium which is then applied to the wood. Sufficient mixture is generally dissolved to form an aqueous solution having a concentration of at least about 5 weight percent and preferably of about 10 weight percent, solids basis. The maximum aqueous concentration of about 50 weight percent and preferably of about 20 weight percent is used in deference to both economics and the general solubility of the mixture. The aqueous medium can be water per se or can be an aqueous solution or dispersion comprising other materials, such as pigments and sealers. The dissolved aqueous mixture is generally applied to the substrate in an amount sufficient to either thoroughly wet the surface of the substrate or thoroughly impregnate the substrate, depending upon the method of application and the degree of protection desired. As regards surface application, on a solids basis, the substrate is usually contacted with at least about 0.005 pound and preferably about 0.01 pound of mixture per square foot of substrate surface. Practical considerations, such as economy, etc., are the only limitations on the maximum amount of mixture that is contacted with the substrate, although for reasons of convenience about 0.05 pound and most preferably 0.02 pound of mixture per square foot of substrate surface is used. As regards impregnation, again on a solids basis, the substrates are usually impregnated with the mixture to at least about 5 weight percent and preferably to about 10 weight percent of the untreated weight of the substrate. Similar to the surface application, practical considerations are the only limitations upon the maximum amount of mixture that can be impregnated into the substrate although for reasons of economy impregnating with the mixture to a maximum of about 70 weight percent and most preferably to a maximum of about 50 weight percent of the untreated weight of the substrate is preferred. After application, the treated substrate is normally dried at elevated temperatures to remove the solvent (here water).

Although the mixture is typically dissolved in an aqueous medium prior to its application to wood, the mixture can be dissolved in a suitable organic medium if desired. Suitable organic medium solubilize the poly-2-oxazoline, inorganic phosphate salts and surfactant and can also include other materials, such as sealers and pigments. Polar solvents are typical organic mediums and include alcohols, esters, etc. Solution and application concentrations comparable to the aqueous medium concentrations are used.

Wood and wood products are the substrates of this invention. Any wood or wood product capable of receiving an application of an aqueous mixture comprising a phosphate salt of a poly-2-oxazoline, an inorganic fire-retardant phosphate salt and an organic phosphate ester surfactant can be used in the practice of this invention. Typical examples include: wood, such as pine, cedar, oak, etc.; wood composites, such as particle- and fiberboard and plywood, etc.; wood-derived products, such as veneer and paper, etc.; and combinations of the preceding, such as paper-coated hardboard and particle board, veneer-surface particle board, and the like.

The following examples are illustrative embodiments of this invention. Unless otherwise noted, all parts and percentages are by weight.

SPECIFIC EMBODIMENTS

Examples 1–6 and Controls A-R: Penetration Studies of Surfactant Additives

Solutions

Unless otherwise indicated, the solutions consisted of 94 parts of a fire-retardant salt, 6 parts of a polymer binder, and 233.3 parts of water. Where the solutions contained no polymer binder, the concentration of the fire-retardant salt was increased from 94 parts to 100 parts. The solutions were well mixed at room temperature prior to their application to the wood.

Wood

Three-ply marine grade, Douglas fir, quarter-inch plywood was used. The wood was not dried prior to the application of a solution.

Procedure

By means of a calibrated syringe, a 10-microliter drop was drawn from a well mixed solution and applied to the wood. The time from the first application of the drop to the surface of the wood to the disappearance of the drop from the surface of the wood was then visually observed and measured with a stopwatch.

Results

The experimental and control results are reported in Table I. The polymer binder definition as well as the definitions of the various fire-retardant salts and surfactants are recorded in the footnote legends.

TABLE I

| | | Penetration Studies of Surfactant Additives | | | | |
|---|---|---|---|---|---|---|
| Ex.& Con. | Solution[1] | % Solids of Solution | Surfactant[2] | % Surfactant (Solids Basis) | Time of Penetration[3] (sec) | Solubility[5] of Surfactant |
| A | PSPEO$_x$/ FR-A | 20 | — | — | 77 | — |

TABLE I-continued
Penetration Studies of Surfactant Additives

| Ex.& Con. | Solution[1] | % Solids of Solution | Surfactant[2] | % Surfactant (Solids Basis) | Time of Penetration[3] (sec) | Solubility[5] of Surfactant |
|---|---|---|---|---|---|---|
| B | PSPEO$_x$/FR-A | 30 | — | — | 85 | — |
| C | PSPEO$_x$/L.F. | 35 | — | — | >120 | — |
| D | PSPEO$_x$/L.F. | 20 | — | — | 113 | — |
| E | L.F.[4] | 36 | — | — | >120 | — |
| F | L.F.[4] | 20 | — | — | >120 | — |
| G | PSPEO$_x$/L.F. | 20 | Alconox ® | 3.3 | 97 | good |
| H | PSPEO$_x$/FR-A | 20 | Alconox ® | 3.3 | 30 | " |
| I | PSPEO$_x$/L.F. | 20 | Dowfax ® 3B2 | 0.5 | — | Precipitated[7] |
| J | PSPEO$_x$/FR-A | 20 | Dowfax ® 3B2 | 0.5 | — | precipitated |
| K | PSPEO$_x$/L.F. | 20 | Dowfax ® 2A1 | 0.5 | — | " |
| L | PSPEO$_x$/FR-A | 20 | Dowfax ® 2A1 | 0.5 | — | " |
| M | PSPEO$_x$/FR-A | 20 | Aerosol ® OT | 1 | — | " |
| N | PSPEO$_x$/FR-A | 20 | Aerosol ® 22 | 1 | — | " |
| O | PSPEO$_x$/FR-A | 20 | Deriphat ® 154 | 1 | — | " |
| P | PSPEO$_x$/L.F. | 20 | Dispersant ® A | 1 | — | " |
| Q | PSPEO$_x$/FR-A | 20 | Dispersant ® A | 1 | — | " |
| R | PSPEO$_x$/FR-A | 20 | Tergitol ® 08 | 1 | — | " |
| 1 | PSPEO$_x$/FR-A | 20 | V-12 | 5 | 5 | good[6] |
| 2 | PSPEO$_x$/L.F. | 20 | V-12 | 12 | 13 | " |
| 3 | PSPEO$_x$/L.F. | 20 | V-58B | 1.6 | 30 | " |
| 4 | PSPEO$_x$/FR-A | 20 | V-58B | 1.6 | 10 | " |
| 5 | PSPEO$_x$/FR-A | 20 | V-35B | 2 | 11 | " |
| 6 | PSPEO$_x$/L.F. | 20 | V-35B | 1.6 | 20 | " |

[1]Solution Legend:
PSPEO$_x$ = Polymer binder of a 50% hydrolyzed phosphate salt of poly-2-ethyloxazline having a weight average molecular weight of about 125,000.
FR-A = A 40% monobasic ammonium phosphate/60% dibasic ammonium phosphate inorganic fire-retardant formulation manufactured by Monsanto Co.
L.F. = Liquid fertilizer consisting of 60% ammonium polyphosphate and 40% mono-dibasic ammonium phosphate.
[2]Surfactant Legend:

V-12 = Victawet ® 12, a nonionic surfactant of the formula $C_8H_{17}OP(\!\!$$\!\!OR)_2$, R not specified other than a water-solubilizing group, manufactured by Stauffer Chemical Co.
V-58B Victawet ® 58B and Victawet ® 35B, respectively, both anionic surfactants of
and = the formula $Na_5R_5(P_3O_{10})_2$ where R is either capryl or 2-ethylhexyl, both
V-35B manufactured by Stauffer Chemical Co.
Alconox ® = A compounded alkyl aryl sodium sulfonate manufactured by Alconox Inc.
Dowfax ®
3B2 = Disodium 4-decylated oxydibenzenesulfonate manufactured by The Dow Chemical Co.
Dowfax ®
2A1 = Sodium salt of dodecylated sulfonated phenyl ether manufactured by The Dow Chemical Co.
Aerosol ®
OT = Dioctylester of sodium sulfosuccinic acid manufactured by American Cyanamid Co.
Aerosol ®
22 = Tetrasodium N-(1,2-dicarboxyethyl)-N-octadecylsulfosuccinamate manufactured by American Cyanamid Co.
Deriphat ®
154 = Disodium salt of N-tallow β-amino dipropionate manufactured by General Mills, Inc.
Dispersant ®
A = A condensation product of ethylene oxide and an alkyl phenol manufactured by Chevron Chemical Co.
Tergitol ®
08 = Sodium sulfate derivative of 2-ethyl-1-hexanol manufactured by Union Carbide Corp.
[3]Average of two runs. If surfactant precipitated from solution, then no penetration studies were made.
[4]No polymer binder.
[5]Visually measured after thorough mixing.
[6]Good means no visually detectable surfactant precipitate.
[7]Precipitated means a visual amount of surfactant did not enter or remain in solution after mixing.

Discussion

The data of Table I demonstrates the effect of the various anionic and nonionic organic phosphate ester surfactants on the rate of penetration of the various solutions. The surfactants of this invention significantly increase the rate of penetration of the solutions despite the variance in their fire-retardant salts and varying levels of solids concentration. Moreover, all of the organic phosphate ester additives tested demonstrated good compatibility with and solubility in the solutions.

Examples 7–10 and Controls S–V: Two-Foot Tunnel Test

Solutions

Solutions were prepared from the same materials and in the same manner as for Examples 1–6 and Controls A–R. Solution and surfactant definitions are the same as those described in the footnote legends of Table I.

Wood

Three-ply marine grade, Douglas fir, quarter-inch plywood was used. The wood was not dried before application of a solution.

Procedure

Thirty-gram quantities of a solution were poured upon the surface of the wood and then spread evenly with a brush or roller. After 30 seconds for the example runs and 90–120 seconds for the control runs, any excess solution was wiped from the surface. The flame-spread rating of each treated wood sample was then made by following the procedures described by H. L. Vandersall, "Use of a Small Flame Tunnel in the Laboratory Evaluation of Flame Spread Rating", Special Report No. 6090 (May 5, 1964) available from Monsanto Co.

Results

The flame-spread and flame-spread rating of each treated wood sample is reported in Table II. Definition of the solution and surfactants is found in the footnote legends of Table I.

TABLE II[1]

| | | Two-Foot Tunnel Test | | | |
|---|---|---|---|---|---|
| Ex.& Con. | Solution | % Solids of Solution | Surfactant | % Surfactant (Solids Basis) | Flame-Spread[2] | Flame-Spread[2] Rating |
| S | PSPEO$_x$/FR-A | 20 | — | — | 9.67 | 71.86 |
| T | PSPEO$_x$/L.F. | 20 | — | — | 10.33 | 76.75 |
| U | PSPEO$_x$/FR-A | 20 | Alconox ® | 3.3 | 10 | 74.25 |
| V | PSPEO$_x$/L.F. | 20 | Alconox ® | 3.3 | 10.5 | 78 |
| 7 | PSPEO$_x$/FR-A | 20 | V-35B | 1.6 | 9.33 | 69.3 |
| 8 | PSPEO$_x$/FR-A | 20 | V-35B | 1.6 | 10.88 | 80.45 |
| 9 | PSPEO$_x$/L.F. | 20 | V-58B | 1.6 | 10.16 | 75.2 |
| 10 | PSPEO$_x$/FR-A | 20 | V-35B | 1.6 | 9.99 | 75.2 |

[1]Refer to footnote legends of Table I for definitin of solutions and surfactants.
[2]Average of two runs.

Discussion

The data of Table II demonstrates that not only does this invention produce modified wood with comparable flame-spread ratings to the modified wood of the prior art, but also produces the modified wood in about 25 percent of the time required to produce the modified wood of the prior art. Moreover, generally the modified wood produced by this invention has a superior flame-spread rating (a lower value) than the modified wood of the prior art.

Although the invention has been described in considerable detail as regards 50 percent phosphorylated poly(2-ethyl-2-oxazoline) and a fire-retardant formulation of mono- and dibasic ammonium phosphate or liquid fertilizer, such detail is for the purpose of illustration only and many variations and modifications can be made by one skilled in the art without departing from the spirit and scope of the appended claims.

What is claimed is:

1. An improved process for applying a fire-retardant composition to wood or a wood product, the composition consisting essentially of an inorganic fire-retardant phosphate salt and a binder of a poly-2-oxazoline having a weight average molecular weight of at least about 1,000 and at least about 40 percent phosphorylated, the process comprising applying to the wood or wood product a fire-retardant amount of a solution of the composition, the improvement comprising admixing with the composition either prior to or simultaneously with the application of the composition to the wood or wood product an anionic or nonionic organic phosphate ester surfactant compatible with the solution of the composition and in an amount sufficient to increase the rate and extent of penetration of the composition into the wood or wood product.

2. The method of claim 1 wherein the phosphate ester surfactant is of the formula

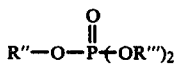   (VI)

or

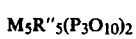   (VII)

where:

R″ is a hydrophobic radical, R‴ is a hydrophilic radical, and M is a neutralizing cation.

3. The method of claim 2 where R″ is a C$_4$–C$_{10}$ aliphatic or alicyclic hydrocarbon radical, R‴ is a polyalkylene glycol or glycol ether radical, and M is a sodium cation.

4. The method of claim 3 wherein the solution is aqueous.

5. The method of claim 4 wherein the solution comprises at least about 5 weight percent, solids basis, of the composition.

6. The method of claim 4 wherein the solution comprises between about 10 and about 20 weight percent, solids basis, of the composition.

7. The method of claim 6 wherein the wood or wood product is contacted with at least about 0.005 pound of composition per square foot of wood or wood product surface.

8. The method of claim 7 wherein the weight average molecular weight of the phosphorylated poly-2-oxazoline is at least about 100,000.

9. The method of claim 8 wherein the composition consists essentially of between about 5 and about 25 weight percent of the phosphorylated poly-2-oxazoline and between about 75 and about 95 weight percent of the fire-retardant composition.

10. The method of claim 9 wherein the phosphorylated poly-2-oxazoline is between about 50 and about 90 percent phosphorylated.

11. The method of claim 10 wherein the poly-2-oxazoline is poly(2-methyl-2-oxazoline), poly(2-ethyl-2-oxazoline) or poly(2-H-2-oxazoline).

12. The method of claim 11 wherein the inorganic phosphate salt of the fire-retardant composition consists essentially of about 35 to about 45 weight percent monoammonium phosphate with the remainder diammonium phosphate.

13. The method of claim 11 wherein the inorganic phosphate salt of the fire-retardant composition consists essentially of liquid fertilizer.

14. The method of claim 12 or 13 wherein R" is an octyl radical.

15. A surfactant-modified fire-retardant composition useful for imparting fire-retardancy to wood or wood products consisting essentially of:
(a) an inorganic, fire-retardant phosphate salt;
(b) a binder of a poly-2-oxazoline having a weight average molecular weight of at least about 1,000 and at least about 40 percent phosphorylated; and
(c) an anionic or nonionic organic phosphate ester surfactant compatible with a solution of the inorganic phosphate salt and the binder.

16. The composition of claim 15 wherein the organic phosphate ester surfactant is of the formula

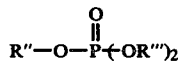 (VI)

or

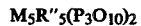 (VII)

where:
R" is a hydrophobic radical, R'" is a hydrophilic radical, and M is a neutralizing cation.

17. The composition of claim 16 wherein R" is a $C_4$–$C_{10}$ aliphatic or alicyclic hydrocarbon radical, R'" is a polyalkylene glycol or glycol ether radical, and M is a sodium cation.

18. The composition of claim 17 wherein the organic phosphate ester is present at a concentration of at least about 0.01 weight percent, based upon the combined weight of the inorganic phosphate salt and binder.

19. The composition of claim 18 wherein the weight average molecular weight of the phosphorylated poly-2-oxazoline is at least about 100,000.

20. The composition of claim 19 wherein the phosphorylated poly-2-oxazoline is present at a concentration of at least about 2 weight percent based on the weight of the inorganic phosphate salt.

21. The composition of claim 20 wherein at least 50 weight percent consists essentially of the inorganic phosphate salt.

22. The composition of claim 18 consisting essentially of, by weight:
(a) 75 to about 95 weight percent of the inorganic phosphate salt;
(b) 5 to about 25 weight percent of the phosphorylated poly-2-oxazoline binder; and
(c) at least about 0.01 percent of the organic phosphate ester.

23. The composition of claim 22 wherein the poly-2-oxazoline is between about 15 and about 90 percent phosphorylated.

24. The composition of claim 23 wherein the poly-2-oxazoline is poly(2-methyl-2-oxazoline), poly(2-ethyl-2-oxazoline) or poly(2-H-2-oxazoline).

25. The composition of claim 24 wherein the inorganic phosphate salt consists essentially of about 35 to about 45 weight percent monoammonium phosphate with the remainder being diammonium phosphate.

26. The composition of claim 24 wherein the inorganic phosphate salt consists essentially of liquid fertilizer.

27. The composition of claim 17 wherein the organic phosphate ester is present at a concentration of at least about 0.05 weight percent, based on the combined weight of the inorganic phosphate salt and binder.

28. Wood or a wood product treated with the composition of claim 15, 22, 25 or 26.

UNITED STATES PATENT AND TRADEMARK OFFICE
CERTIFICATE OF CORRECTION

PATENT NO. : 4,182,794

DATED : January 8, 1980

INVENTOR(S) : William L. Smith and Robert H. Lalk

It is certified that error appears in the above-identified patent and that said Letters Patent are hereby corrected as shown below:

Column 3, line 38: "90 of" should read --90 percent of--.

Column 4, line 3: "consideration," should read --considerations,--.

Column 7, footnote 1, line 2: "poly-2-ethyloxazline" should read --poly-2-ethyloxazoline--.

Column 9, TABLE II, item 7, second column: "FR-A" should read --L.F.--.

Column 9, TABLE II, footnote 1: "definitin" should read --definition--.

Signed and Sealed this

Tenth Day of June 1980

[SEAL]

Attest:

SIDNEY A. DIAMOND

Attesting Officer

Commissioner of Patents and Trademarks